United States Patent
Breen et al.

(10) Patent No.: US 11,520,392 B1
(45) Date of Patent: Dec. 6, 2022

(54) OPERATING A POWER SOURCE AS A HEATING DEVICE IN AN INFORMATION HANDLING SYSTEM (IHS)

(71) Applicant: Dell Products, L.P., Round Rock, TX (US)

(72) Inventors: John J. Breen, Harker Heights, TX (US); Jaehyeung Park, Round Rock, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/464,320

(22) Filed: Sep. 1, 2021

(51) Int. Cl.
| | | |
|---|---|---|
| *G06F 1/26* | (2006.01) | |
| *H02M 3/335* | (2006.01) | |
| *H02M 3/158* | (2006.01) | |
| *G06F 1/20* | (2006.01) | |
| *G06F 11/30* | (2006.01) | |
| *G06F 9/48* | (2006.01) | |
| *G06F 9/50* | (2006.01) | |
| *G06F 11/00* | (2006.01) | |
| *G06F 9/30* | (2018.01) | |

(52) U.S. Cl.
CPC ............. *G06F 1/26* (2013.01); *G06F 1/263* (2013.01); *G06F 1/206* (2013.01); *G06F 9/30083* (2013.01); *G06F 9/4893* (2013.01); *G06F 9/5094* (2013.01); *G06F 11/002* (2013.01); *G06F 11/3058* (2013.01); *H02M 3/158* (2013.01); *H02M 3/33573* (2021.05)

(58) Field of Classification Search
CPC . G06F 1/26; G06F 1/206; G06F 1/263; G06F 9/5094; G06F 9/4893; G06F 9/30083; G06F 11/3058; G06F 11/002; H02M 3/33573; H02M 3/158
USPC ........................................................ 713/300
See application file for complete search history.

(56) References Cited

U.S. PATENT DOCUMENTS

| | | | | |
|---|---|---|---|---|
| 7,641,386 | B2 * | 1/2010 | Chen ...................... | G09G 3/002 349/5 |
| 8,200,993 | B2 * | 6/2012 | Chiu ........................ | G06F 1/20 713/300 |
| 8,358,145 | B1 * | 1/2013 | Ferris ................... | G11B 19/048 360/75 |
| 11,070,074 | B2 * | 7/2021 | Yi ........................ | H01M 10/486 |
| 2009/0198387 | A1 * | 8/2009 | Lin ........................... | G06F 1/26 713/2 |
| 2010/0277128 | A1 * | 11/2010 | Tam ................... | H02J 7/007192 320/150 |
| 2011/0296155 | A1 * | 12/2011 | Belady ..................... | G06F 9/44 713/300 |
| 2014/0285155 | A1 * | 9/2014 | Choi ........................ | H02J 7/02 320/134 |
| 2016/0218523 | A1 * | 7/2016 | Curtis ................. | H02J 7/00047 |
| 2017/0005498 | A1 * | 1/2017 | Pais .................. | H02J 7/007194 |

(Continued)

*Primary Examiner* — Ji H Bae
(74) *Attorney, Agent, or Firm* — Fogarty LLP

(57) ABSTRACT

Systems and methods for operating a power source as a heating device in an Information Handling System (IHS) are described. In some embodiments, an IHS may include a processor and a memory coupled to the processor, the memory having program instructions stored thereon that, upon execution, cause the IHS to: receive an indication to increase a temperature of the IHS and, in response to the indication, concurrently set a first power supply in source mode and a second power supply in sink mode.

20 Claims, 4 Drawing Sheets

(56) References Cited

U.S. PATENT DOCUMENTS

2020/0119410 A1\* 4/2020 Tian .................... H02J 7/00714
2020/0176999 A1\* 6/2020 Rastegar ............. H01M 10/654

\* cited by examiner

OPERATING A POWER SOURCE AS A HEATING DEVICE IN AN INFORMATION HANDLING SYSTEM (IHS)

FIELD

This disclosure relates generally to Information Handling Systems (IHSs), and, more specifically, to systems and methods for operating a power source as a heating device in an IHS.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The inventors hereof have determined that the recent growth of distributed data generation and consumption has created a need for high-speed communications and performance computations to take place geographically near consumers. As a result, IHSs deployed as part of new telecommunication infrastructures are now more likely to be subject to extreme temperature conditions, which raises several issues.

For example, in freezing conditions many IHS components are out of specification and cannot operate properly. Processors, memories, etc. are generally not designed to perform "cold starts" (i.e., powering up at temperatures of −40° C. to 0° C.).

To address this, a dedicated heater may be deployed inside the IHS. As the inventors have recognized, however, a dedicated heater takes up IHS chassis space that could otherwise be occupied by other devices such as, for instance, redundant power supplies, or the like. To address these, and other issues, the inventors have developed systems and methods for operating power sources as heating devices in an IHS.

SUMMARY

Systems and methods for operating a power source as a heating device in an Information Handling System (IHS) are described. In an illustrative, non-limiting embodiment, an IHS may include a processor and a memory coupled to the processor, the memory having program instructions stored thereon that, upon execution, cause the IHS to: receive an indication to increase a temperature of the IHS and, in response to the indication, concurrently set a first power supply in source mode and a second power supply in sink mode.

For example, the indication may be received in response to the IHS entering a start-up or pre-heating mode. Additionally, or alternatively, the indication may be received in response to a determination that the temperature is below a selected value.

The program instructions, upon execution, may cause the IHS to, in response to the indication, disconnect a load from the first and second power supplies. Additionally, or alternatively, the IHS may apply an output of the first power supply to a heat-producing element disposed on a motherboard.

In some cases, the heat-producing element may include a resistor. The first and second power supplies may include Voltage Regulators (VRs) coupled to one or more IHS components disposed on a motherboard. The program instructions, upon execution, may cause the IHS to select the VRs among a plurality of VRs based upon a physical location of the one or more IHS components. Moreover, the one or more IHS components may include the processor.

The first and second power supplies may include Power Supply Units (PSUs) coupled to a motherboard. The first or second PSU may include a redundant PSU. The program instructions, in response to the indication, may cause the IHS to configure the first and second PSUs to operate at full power.

The second PSU may be coupled to a first control circuit configured to maintain an output of a second stage of the second PSU with a selected electrical current. The second PSU may be coupled to a second control circuit configured to maintain an output of a first stage of the second PSU at a selected voltage.

The program instructions, in response to the indication, cause the IHS to reduce an efficiency of at least one or the first or second power supplies. The program instructions, in response to the indication, may cause the IHS to operate a fan configured to disperse heat produced by at least one of the first or second power supplies.

In another illustrative, non-limiting embodiment, a memory storage device may have program instructions stored thereon that, upon execution by an IHS, cause the IHS to: set a PSU coupled to the IHS to operate in source mode; and set a redundant PSU coupled to the IHS to operate in sink mode while the PSU operates in source mode. The PSU and the redundant PSU may be set in response to the IHS entering a pre-heating mode of operation.

In another illustrative, non-limiting embodiment, a method may include: receiving an instruction to produce heat; and in response to the instruction, operating a first VR in source mode and simultaneously operating a second VR in sink mode. The method may further include selecting the first and second VRs among a plurality of VRs based upon a physical location of the first and second VRs with respect to a component of an IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
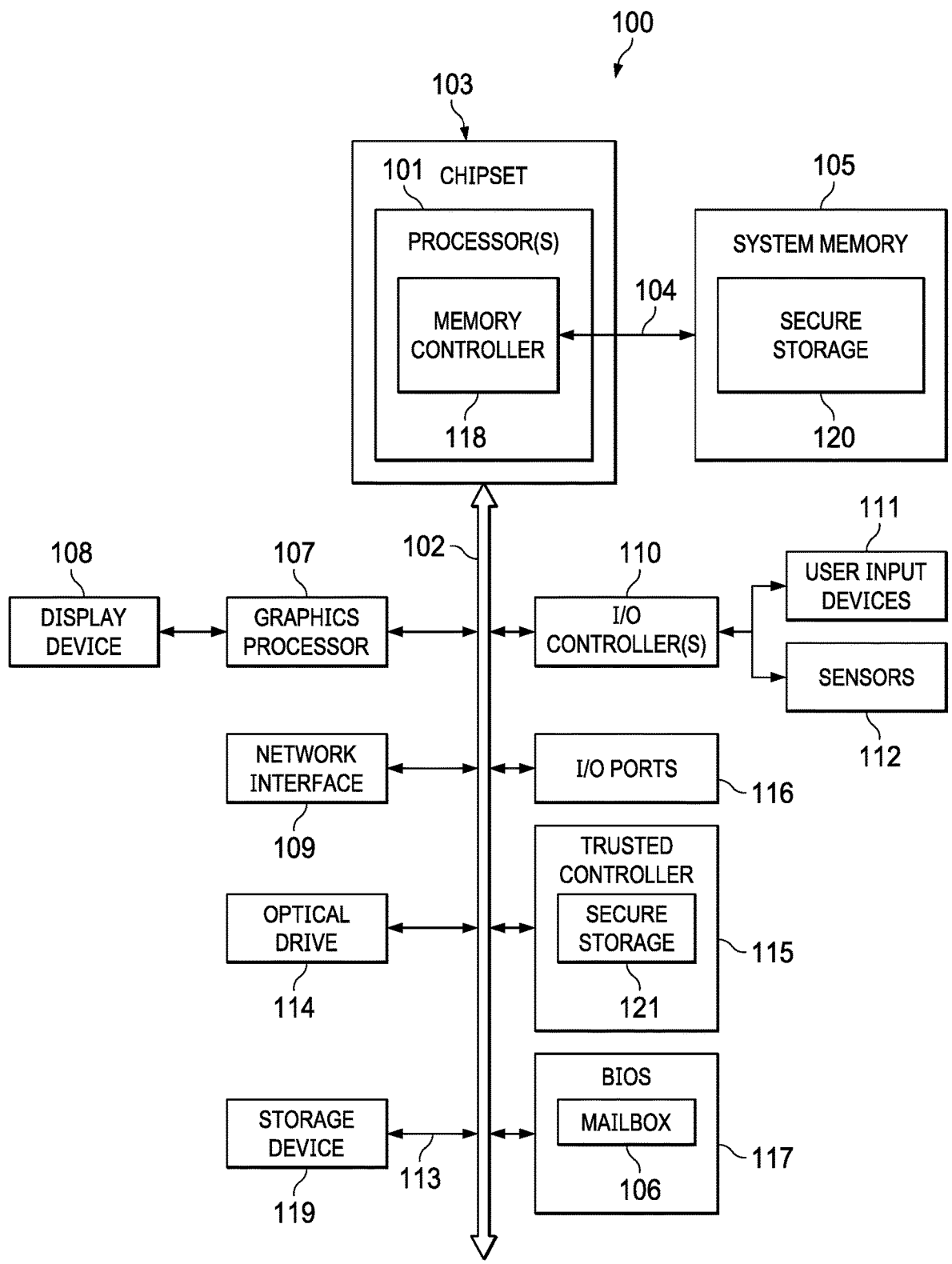
FIG. 1 is a diagram depicting examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server, Telecom server, etc.), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100 usable with systems and methods for operating a power source as a heating device in an IHS. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor, an AMD processor, or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS.

Chipset 103 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, BIOS mailbox 106 may be utilized as a secure storage utilized by a remote orchestration service in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. In various embodiments, trusted controller 115 may perform one or more operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also implement operations for interfacing with a Power Supply Unit (PSU) or adapter (show in FIG. 2) to manage power for IHS 100. Such operations may be utilized to determine the power status of IHS 100, such as whether IHS 100 is operating from battery power or is plugged into an AC power source. In various embodiments, trusted controller 115 also may be configured to select different modes of operation of one or more PSUs. For example, trusted controller 115 may concurrently set a first PSU in source mode and second PSU in sink mode to produce heat inside the chassis and manage the temperature of IHS 100, as described in more detail below.

Firmware instructions utilized by trusted controller 115 may be used to operate a secure execution environment that may include operations for providing various core functions of IHS 100, such as power management and management of certain operating modes of IHS 100 (e.g., turbo modes, maximum operating clock frequencies of certain components, etc.).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support different reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These types of power modes may be entered, for example, when IHS 100 transitions into standby (e.g., "idle," "sleep," etc.). A Modern Standby session encompasses the entire screen-off to screen-on user scenario; but, unlike traditional S3 sleep, it allows selected software activities to run periodically. In some implementations, low power is achieved by only waking from the lowest power state when necessary and by only allowing software to execute in short, controlled bursts of activity, thus reducing the opportunities for software components to execute. When IHS 100 enters the S0 low power idle state (e.g., the Desktop Activity Moderator phase), all applications and services in the suspend category are paused, and all applications and services in the throttle category run with reduced activity. IHS 100 resumes from standby and returns to "active mode," for example, in response to user inputs, interrupts from networking devices, and other hardware events.

In some embodiments, an IHS 100 may not include all the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Components of IHS 100 may be disposed on a motherboard coupled to a chassis.

These components receive electrical power from one or more PSUs inserted into one or more PSU bays within the chassis. In a chassis having two PSU bays, for example, a redundant (1+1) PSU configuration would require both bays to be occupied by PSUs. When IHS 100 is deployed in cold environments, however, a dedicated heater (e.g., ~240 W, having a PSU form factor) is ordinarily mounted into one of the two PSU bays to provide sufficient heat for IHS 100 to operate within its specifications, and the chassis cannot accommodate a redundant PSU.

To address this, in various systems and methods described herein, rather than deploying a dedicated heater, a power source (e.g., PSU) may be operated as a heating device in IHS 100. As used herein, the term "source mode" refers a mode of operation of a PSU whereby it outputs electrical current from its positive terminal. Conversely, the term "sink mode" refers a mode of operation of a PSU whereby it pulls electrical current into its positive terminal.

In some embodiments, during start-up and/or pre-heat operation of an IHS having two PSUs, a first PSU may operate in source mode (e.g., at full power 1100 W) while a second PSU operates in sink mode (i.e., also at full power), thus returning all the energy to the input source (e.g., an AC or DC source). Because no energy is delivered to the motherboard load while both PSUs operate, the only energy drawn is the total loss of both PSUs. For example, in the case of two 1100 W PSUs, if their efficiency is 90%, the energy loss effectively due to heating is 110 W for each PSU, for a total 220 W (heat from the 2 PSUs combined).

In some embodiments, a portion of the electrical current output by the first PSU may be sunk by the second PSU to provide a selectable amount of heat during normal operation of IHS 100 (e.g., after boot), in addition to powering the IHS components up. Additionally, or alternatively, a power conversion efficiency of one (or both) PSUs may be controllably reduced (e.g., by increasing a switching frequency or voltage point) for the purpose of producing heat.

In other embodiments, at least one pair of voltage regulators (VRs), Fully Integrated Voltage Regulators (FIVRs), and/or VR modules disposed within or near a component (e.g., processor(s) 101) may be used to source and sink current to produce heat for that component. For example, a method may include operating a first VR in source mode and simultaneously operating a second VR in sink mode. Pairs of VRs may be selected among a plurality of VRs based upon a physical location of the one or more IHS components that need to be heated. In some cases, PSUs may take the balance of any heating requirement the VRs cannot handle.

In yet other embodiments, other heating elements (e.g., resistors, etc.) may be disposed on a Power Distribution Board (PDB) and/or a selected motherboard location, optionally coupled to one or more fans configured to distribute heat produced by these various mechanisms within a chassis.

In some cases, the amount of heat produced by each of these different mechanisms (e.g., a pair of PSUs set in source/sink modes, PSU(s) set with a lower efficiency, a pair of VRs set in current source/sink modes, other heating elements coupled to a fan, etc.) may be selected based upon context. For example, a heat management policy may be enforced such that, under different conditions (e.g., current ambient temperature, geographical location, time-of-day, identity and/or proximity of a user, availability and/or capabilities of alternative heating mechanisms, whether IHS 100 is in pre-heat mode or normal operation, etc.), different mechanisms may be used in varying combinations, each mechanism providing an allocated portion of the total heat needed to enable the proper operation of IHS 100.

Figure 2:
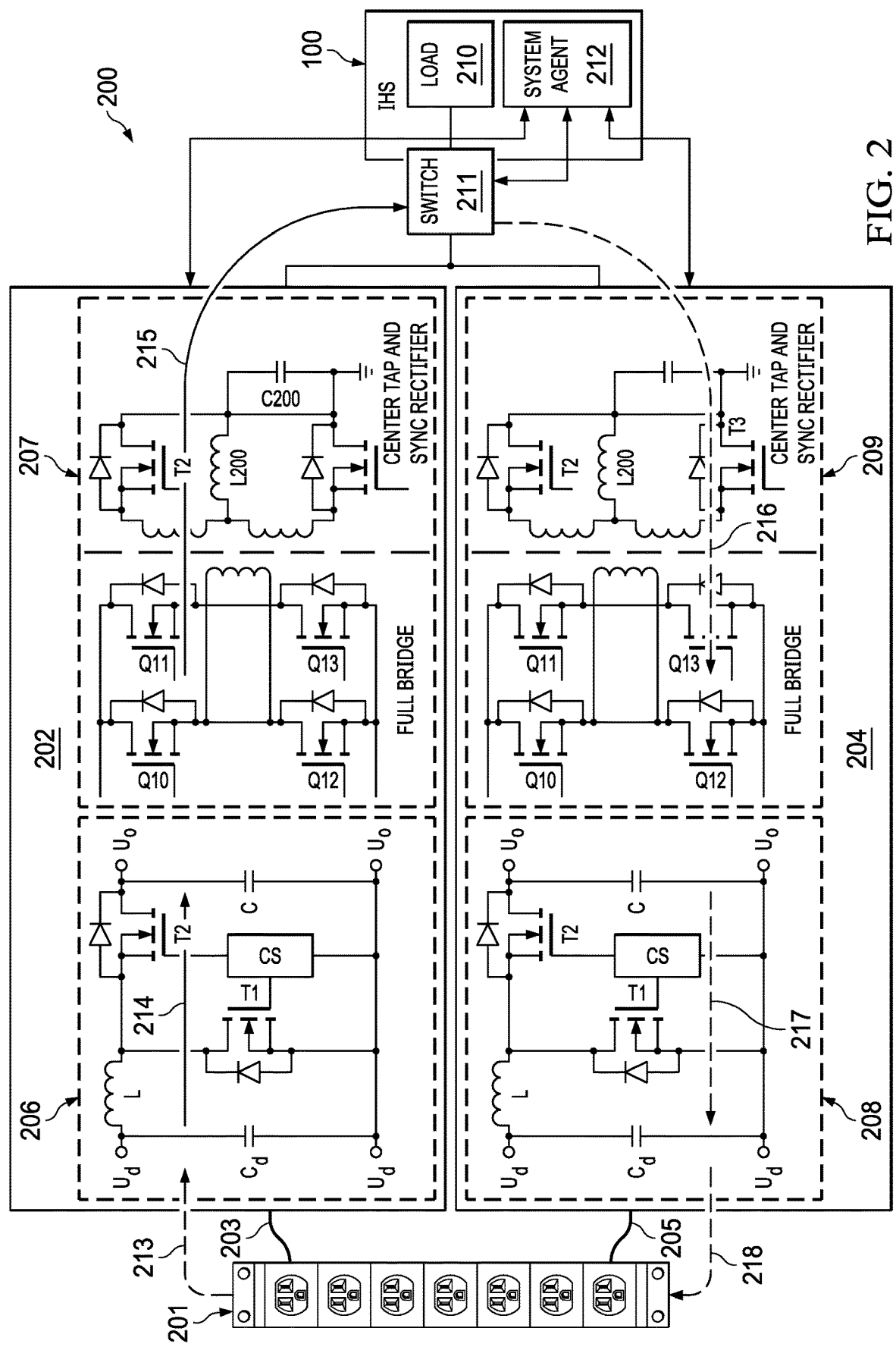
FIG. 2 is a diagram illustrating an example of systems and methods for using a power source as a heating device, according to some embodiments.

FIG. 2 is a diagram illustrating an example of systems and methods 200 for using a power source as a heating device. In this embodiment, first PSU 202 and second, redundant PSU 204 are configured to provide power to load 210 (e.g., one or more components shown in FIG. 1) of IHS 100 through switch 211. First PSU 202 is coupled to input source 201 (e.g., an AC source, a DC source, a PDU, etc.) via first power cable 203, and second PSU 204 is coupled to input source 201 via second power cable 205.

In some implementations, input source 201 may be a 48 V DC source. In other implementations, input source 201 may include any suitable DC or AC source. Each of PSUs 202 and 204 may be implemented as a "–48 V" input PSU and may include two stages: a pre-conditioning stage 206 and 208 (e.g., a sync DC-DC converter to boost the input source voltage to 300 V), and a regulation stage 207 and 209 (e.g., an isolated DC-DC converter to provide a 12 V output), respectively. Both stages may operate bidirectionally, and sometimes may be combined and/or modified into a single stage.

Under normal temperature conditions, first PSU 202 and/or second PSU 204 may provide power to load 210 via switch 211, for example, by operating in source mode and feeding an internal 12 V bus on the motherboard. In cold weather, however, first PSU 202 may operate in source mode and second PSU 204 may operate in sink mode, or vice-versa, so that they may be used as heating devices.

For example, in a pre-heating use-case where IHS 100 has not yet booted and/or powered certain components, both PSUs 202 and 204 may be disconnected from load 210 through operation of switch 211 and the output of first PSU 202 is coupled to the output of second PSU 204. First pre-conditioning stage 206 draws current 213 and outputs current 214 while first PSU 202 operates in current sourcing mode. First regulation stage 207 of first PSU 202 receives current 214 and outputs current 215, switch 211 is used to isolate PSU 202 and 204 from load. Second pre-conditioning stage 208 of second PSU 204 draws current 217 and returns current 218 to input source 201.

System agent 212 (e.g., an agent executed by EC or trusted controller 115, an OS agent, an application, etc.) may be employed to control the different modes of operation of first PSU 202, switch 211, and/or second PSU 204. For example, system agent 212 may receive an instruction and, in response to the instruction, it may concurrently set first PSU 202 in source mode and second PSU 204 in sink mode. Such an instruction may include, of instance a command to: modify a temperature of IHS 100 (e.g., increase the temperature), enter and/or exit a pre-heating mode, to orchestrate heat production in normal mode across different heating mechanisms (e.g., redundant PSUs in source and sink modes, PSU(s) with reduced efficiency, chip or motherboard VRs, resistors, fans, etc.) based upon context changes, etc.

Figure 3:
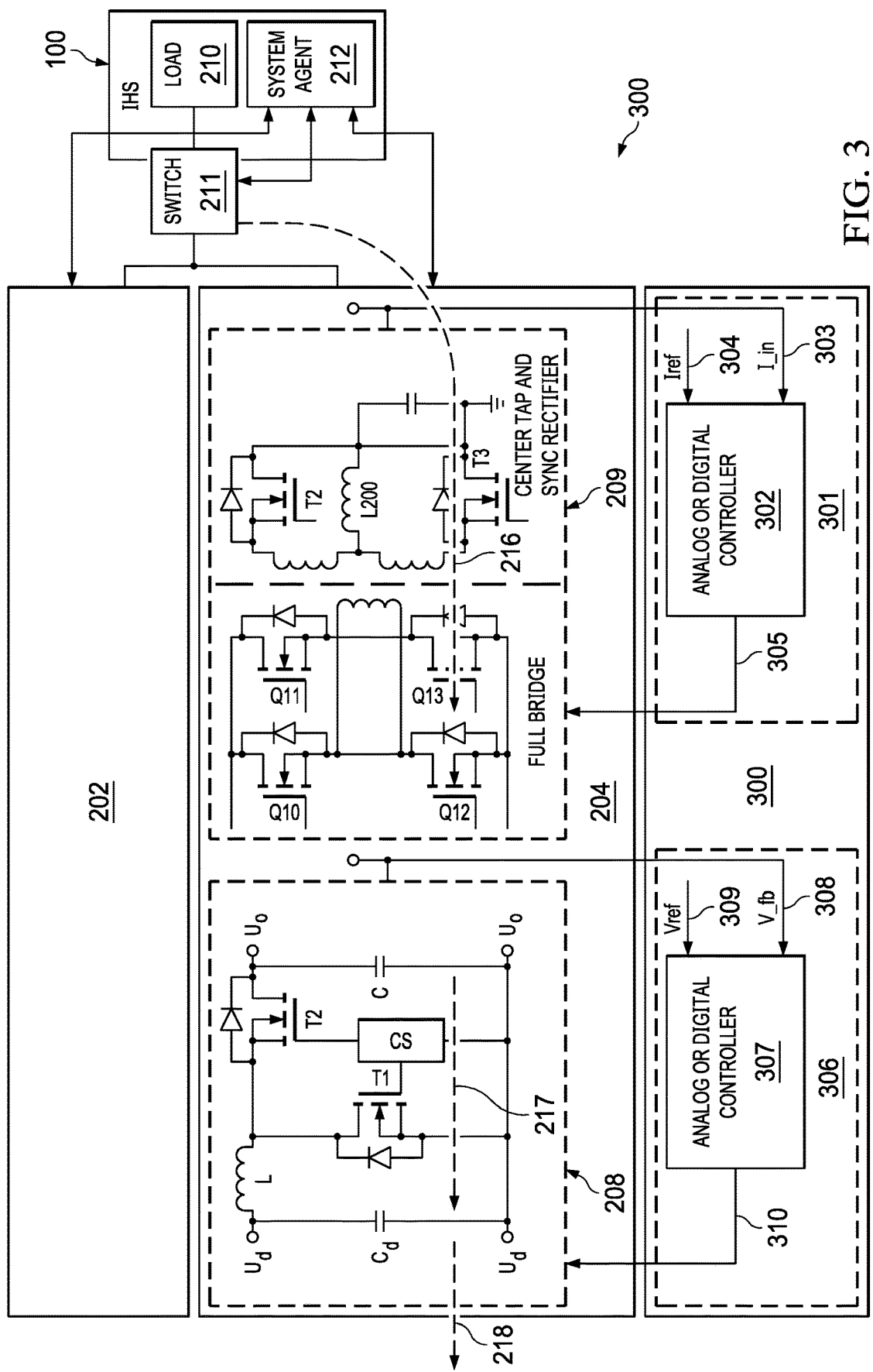
FIG. 3 is a diagram illustrating an example of systems and methods for controlling aspects of the operation of the power source, according to some embodiments.

FIG. 3 is a diagram illustrating an example of systems and methods for controlling aspects of the operation of the power source. In some embodiments, control circuit 300 may be coupled to second PSU 204 (or any PSU in sink mode). In current loop portion 301 of control circuit 300, analog or digital controller 302 measures input current (I_in) 303 at the 12V side and controls it to meet reference value (Iref) 304 (e.g., 90 A) in second regulation stage 209 using output 305. In second pre-conditioning stage 208, voltage loop portion 306 of control circuit 300 maintains bus voltage 308 (V_fb) at reference value (Vref) 309 (e.g., 300 V) using output 310, which allows energy to return to input source 201. When a single stage PSU is used, current loop portion 301 of control circuit 300 may be used and voltage loop portion 306 may be omitted.

In some cases, system agent 212 may receive and/or generate an indication in response to IHS 100 entering a start-up or pre-heating mode (e.g., a user pushes a power button when IHS is its off state while the ambient temperature is below a component's operating temperature specification or tolerance). For instance, the indication may be received and/or generated in response to a determination that the temperature is below a selected value.

In response to the indication, system agent 212 may disconnect load 210 from first and/or second PSUs 202 and/or 204 using switch 211. Additionally, or alternatively, in response to the indication, system agent 212 may configure first and/or second PSUs 202 and/or 204 to operate at full power (or if less heat is needed, a selected amount of power less than full power). Additionally, or alternatively, in response to the indication, system agent 212 may reduce an efficiency of at least one of first and/or second PSUs 202 and/or 204. Additionally, or alternatively, in response to the indication, system agent 212 may operate a fan configured to disperse heat produced by first and/or second PSUs 202 and/or 204.

Control circuit 300 may be used by system agent 212 to maintain an output of second regulation stage 209 of second PSU 204 with a selected electrical current when second PSU 204 is in sink mode. Additionally, or alternatively, control circuit 300 may be used by system agent 212 to maintain an output of second pre-conditioning stage 208 of second PSU 204 at a selected voltage, also when second PSU 204 is in sink mode.

Figure 4:
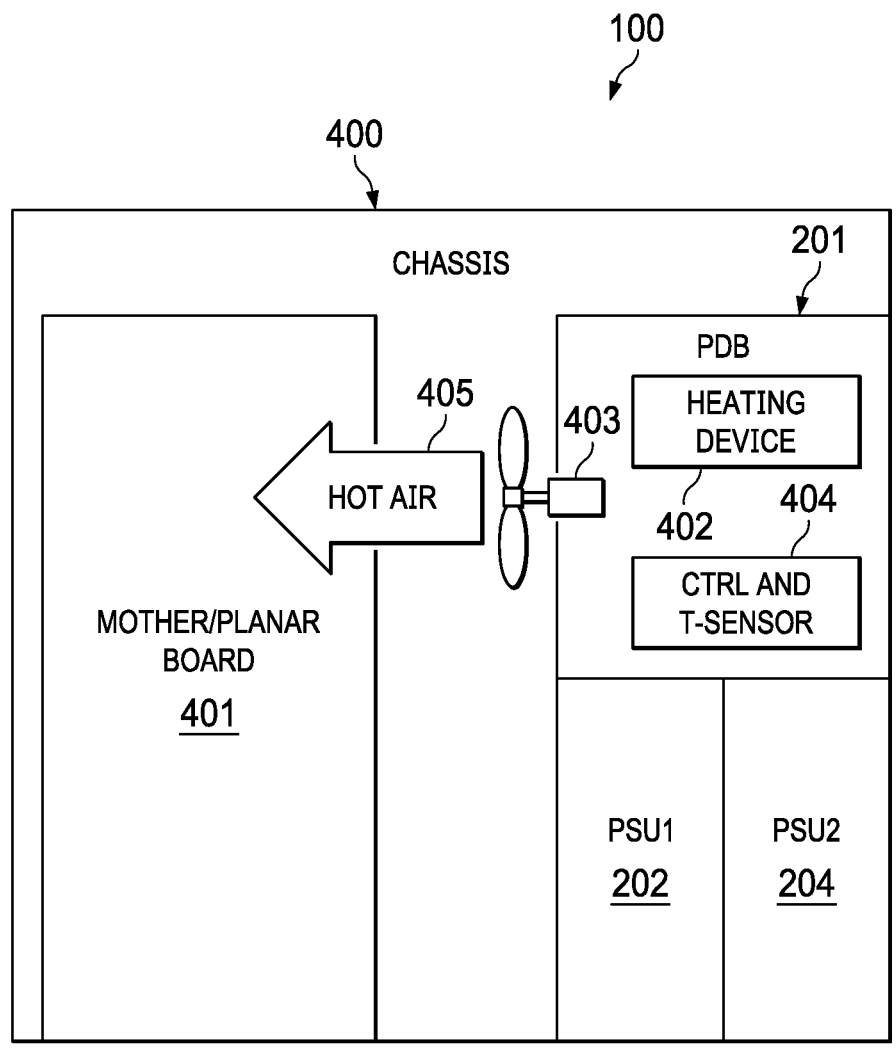
FIG. 4 is a diagram illustrating an example of systems and methods for deploying heating devices on a Power Distribution Board (PDB), according to some embodiments.

FIG. 4 is a diagram illustrating an example of systems and methods for deploying heating devices 402 on PDB 201. Chassis 400 of IHS 100 includes motherboard 401, first PSU 202 and second PSU 204. PDB 201 in turn includes control and temperature sensor circuits 404, heating device(s) 402, and fan 403. In operation, control and temperature sensor circuits 404 may turn heating device(s) 402 (e.g., resistive or dummy loads, VRs, etc.) and fan 403 on and off, for example, in response to a command from system agent 212 to blow hot air 405 towards motherboard 401.

As such, systems and methods described herein may enable operation of a redundant PSU in sink mode with special controls. Additionally, or alternatively, these systems and methods may enable operating one PSU (AC or DC input) in source mode and another PSU in sink mode in parallel, generating a loop. Additionally, or alternatively, these systems and methods may enable operating both power supplies at full power but not delivering electrical energy to the load side, using the heat loss to utilize them like a heater. Additionally, or alternatively, these systems and methods may provide a preheat mode of operation for IHSs with two or more PSUs. Additionally, or alternatively, these systems and methods may enable the addition of resistive loads at a 12 V bus to generate heat during the preheat mode.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), the IHS comprising:
   a processor; and
   a memory coupled to the processor, the memory having program instructions stored thereon that, upon execution, cause the IHS to:
   receive an indication to increase a temperature of the IHS; and
   in response to the indication: concurrently set a first power supply in source mode and a second power supply in sink mode, and operate a fan configured to disperse heat produced by at least one of the first or second power supplies.

2. The IHS of claim 1, wherein the indication is received in response to the IHS entering a start-up or pre-heating mode.

3. The IHS of claim 1, wherein the indication is received in response to a determination that the temperature is below a selected value.

4. The IHS of claim 1, wherein the program instructions, upon execution, cause the IHS to, in response to the indication, disconnect a load from the first and second power supplies.

5. The IHS of claim 4, wherein the program instructions, upon execution, cause the IHS to, in response to the indication, apply an output of the first power supply to a heat-producing element disposed on a motherboard.

6. The IHS of claim 5, wherein the heat-producing element comprises a resistor.

7. The IHS of claim 1, wherein the first and second power supplies comprise Voltage Regulators (VRs) coupled to one or more IHS components disposed on a motherboard.

8. The IHS of claim 7, wherein the one or more IHS components comprise the processor.

9. The IHS of claim 7, wherein the program instructions, upon execution, cause the IHS to select the VRs among a plurality of VRs based upon a physical location of the one or more IHS components.

10. The IHS of claim 1, wherein the first and second power supplies comprise Power Supply Units (PSUs) coupled to a motherboard.

11. The IHS of claim 10, wherein the first or second PSU comprises a redundant PSU.

12. The IHS of claim 11, wherein the program instructions, in response to the indication, cause the IHS to configure the first and second PSUs to operate at full power.

13. The IHS of claim 11, wherein the second PSU is coupled to a first control circuit configured to maintain an output of a second stage of the second PSU with a selected electrical current.

14. The IHS of claim 13, wherein the second PSU is coupled to a second control circuit configured to maintain an output of a first stage of the second PSU at a selected voltage.

15. The IHS of claim 1, wherein the program instructions, in response to the indication, cause the IHS to reduce an efficiency of at least one of the first or second power supplies.

16. A memory storage device having program instructions stored thereon that, upon execution by an Information Handling System (IHS), cause the IHS to:

receive an indication to increase a temperature of the IHS; and in response to the indication: (i) concurrently set a first power supply in source mode and a second power supply in sink mode, wherein the first and second power supplies comprise Power Supply Units (PSUs) coupled to a motherboard and the first or second PSU comprises a redundant PSU; and (ii) configure the first and second PSUs to operate at full power.

17. The memory storage device of claim 16, wherein the first and second power supplies are set in response to the IHS entering a pre-heating mode of operation.

18. The memory storage device of claim 16, wherein the program instructions, upon execution, cause the IHS to operate a fan configured to disperse heat produced by at least one of the first or second power supplies.

19. A method, comprising:
receiving an instruction to produce heat; and
in response to the instruction, operating a first Voltage Regulator (VR) in source mode and simultaneously operating a second VR in sink mode.

20. The method of claim 19, further comprising selecting the first and second VRs among a plurality of VRs based upon a physical location of the first and second VRs with respect to a component of an Information Handling System (IHS).

* * * * *